M. KELLY.

BARBED FENCE-WIRE.

No. 7,036. Reissued April 4, 1876.

○ a. ⊗ a.

William T. Calkins, Assignee of Michael Kelly, Inventor.

By Coburn & Thacher Attys.

Witnesses:
Heinrich L. Bruns.
L. M. Harris.

N. PETERS, PHOTO-LITHOGRAPHER, WASHINGTON, D. C.

UNITED STATES PATENT OFFICE.

MICHAEL KELLY, OF NEW YORK, N. Y., ASSIGNOR, BY MESNE ASSIGNMENTS, TO WILLIAM T. CALKINS, OF CHICAGO, ILLINOIS.

IMPROVEMENT IN BARBED FENCE-WIRES.

Specification forming part of Letters Patent No. 84,062, dated November 17, 1868; Reissue No. 7,036, dated April 4, 1876; application filed February 9, 1876.

DIVISION B.

*To all whom it may concern:*

Be it known that MICHAEL KELLY, of the city and county of New York, and State of New York, did invent a new and useful Improvement in Metallic Fences, which is fully set forth in the following specification, reference being had to the accompanying drawings, in which—

Figure 1:
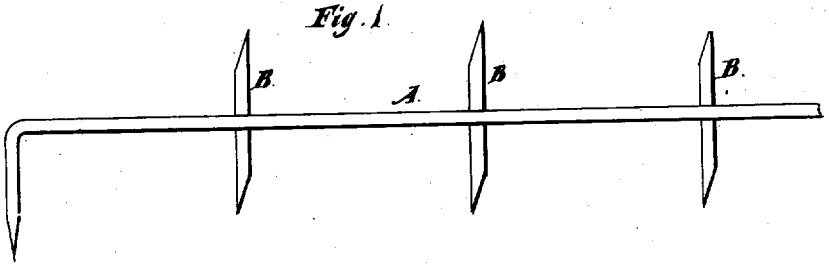
Figure 2:
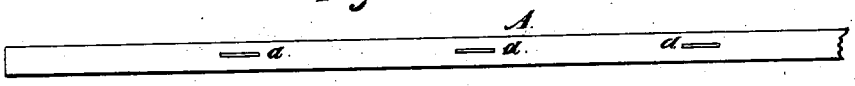
Figure 3:
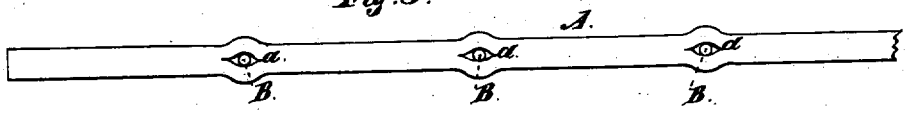
Figure 4:
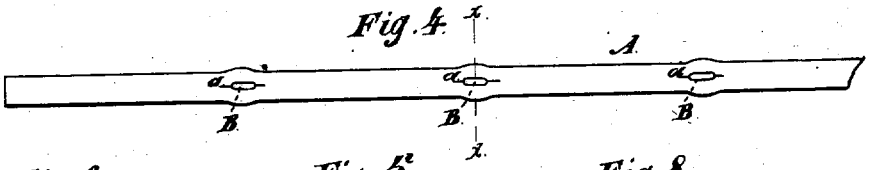
Figure 6:
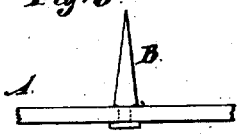
Figure 5:
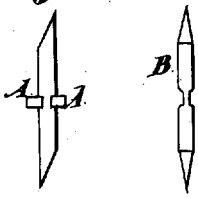
Figure 8:
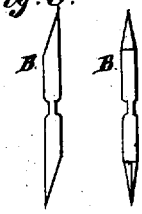
Figure 7:
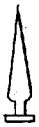

Figure 1 is a plan view of a portion of the wire with the thorns in place, the wire being a flat strip and presented edge upward. Fig. 2 is a side view of the same, representing the wire after the holes have been marked or slightly cut through by a sharp instrument before they have been spread open. Fig. 3 represents the wire after the holes have been spread open by the introduction of a pointed punch or other light instrument and the thorns have been inserted but not secured. Fig. 4 represents the same after the thorns have been firmly secured by compressing the wire and the thorn forcibly together. Fig. 5 represents a cross-section taken on the line *x x*, Fig. 4. Fig. 6 is a plan view of a modification, in which the thorn is made in the form of a common tack. Fig. 7 represents the tack separately before its connection with the wire, and Fig. 8 represents a thorn prepared from common round wire cut obliquely.

The object of this invention is to improve the construction of fence-wires carrying thorns or pointed pieces of metal; and it relates to the construction of the barbs or thorns.

The invention consists in barbs or thorns made from wire by cutting off the latter obliquely in suitable lengths, the barbs being pointed at each end by means of the oblique cut, without the necessity of further manipulation.

In the drawings, A is a flat wire, rolled or otherwise prepared in lengths of any desired extent. Through this wire holes *a* are produced by punching or otherwise by hand or by machinery.

The thorns B are made from common round wire by cutting it off obliquely, as clearly shown in Fig. 8. They may be cut by hand or by machinery, and by cutting them obliquely a sharp point is secured at each end without loss of material and with very little labor. The thorns B are thrust into the holes *a* in the wire, and are there retained by compressing the wire upon the thorns by a blow with a hammer or in any other suitable manner. As an additional means of security, the thorns may be griped in suitable machinery before inserting them in the wire, so as to compress them near the middle, and thus adapt them to be more readily locked. After such compression the thorns will present the appearance shown in Fig. 8 of the drawings.

The thorns may be set in the wire after the fence is erected, if necessary in any case; but it is preferable to set the thorns by hand or by machinery before the wire has left the manufactory. It is also preferable to form the thorns of metal which is a little softer than the wire, so that in the act of compression the thorns will yield and be firmly locked without much drawing or diminishing the thickness of the main wire at that point.

The material for this thorny fence-wire may be iron, tinned or otherwise protected from the weather, and it can be made in any length desired, the thorns being fixed in the wire at such distances as may be desired.

The wires A are represented in the drawings as pointed at the ends and bent at right angles, as indicated at A′. The lengths of thorny wire may be attached to posts set at suitable distances apart by driving the bent end therein, or they may be attached in any other suitable manner, as the method of attachment forms no part of my present invention.

Having thus described the invention, what is claimed as new, and desired to be secured by Letters Patent, is—

1. Thorns or barbs for wire fence, made from wire and provided with cut beveled points at each end, substantially as and for the purpose described.

2. Thorns or barbs for wire fence, pointed at each end and having a depression about midway of its length, substantially as and for the purposes described.

WILLIAM T. CALKINS.

Witnesses:

HEINRICH F. BRUNS,

L. A. BUNTING.